United States Patent [19]
Müller

[11] Patent Number: 5,899,488
[45] Date of Patent: May 4, 1999

[54] AIR BAG ARRANGEMENT AND TRIGGERING PROCESS THEREFOR

[75] Inventor: Olaf Müller, Rüsselsheim, Germany

[73] Assignee: INOVA GmbH Technische Entwicklungen, Rüsselsheim, Germany

[21] Appl. No.: 09/048,125

[22] Filed: Mar. 26, 1998

[30] Foreign Application Priority Data

| Mar. 26, 1997 | [DE] | Germany | 197 12 782 |
| Jun. 24, 1997 | [DE] | Germany | 197 26 878 |
| Aug. 5, 1997 | [DE] | Germany | 197 33 896 |

[51] Int. Cl.⁶ .................................................. B60R 21/16
[52] U.S. Cl. ........................................ 280/728.3; 280/732
[58] Field of Search .................................. 280/732, 728.1, 280/728.2, 728.3

[56] References Cited

U.S. PATENT DOCUMENTS

| 5,056,814 | 10/1991 | Shiraki et al. | 280/728.3 |
| 5,060,971 | 10/1991 | Nanbu et al. | 280/728.3 |
| 5,082,310 | 1/1992 | Bauer | 280/728.3 |
| 5,332,257 | 7/1994 | Rogers et al. | 280/728.3 |
| 5,342,090 | 8/1994 | Sobczak et al. | 280/728.3 |

*Primary Examiner*—Lanna Mai
*Assistant Examiner*—Jeff Restifo
*Attorney, Agent, or Firm*—Evenson, McKeown, Edwards & Lenahan, PLLC

[57] ABSTRACT

The invention relates to an air bag arrangement in a vehicle, having a gas bag device which can be inflated with a propellant by a gas generator 4 as the result of the triggering by a sensor and which, during the inflating, can be advanced into the occupant compartment of the vehicle, a covering device 10 being provided which is driven by a component 5; 5' of the air bag arrangement set in motion after the triggering by a sensor and which opens up an outlet opening 7 for a gas bag 8 and which moves essentially inside an outer contour 15 of the air bag arrangement or of a vehicle part containing the air bag arrangement. Furthermore, the invention relates to a process for triggering an air bag arrangement, for example, in a vehicle, characterized in that, as the result of the triggering by a sensor, first a covering device is driven by a component 5' of he air bag arrangement set in motion after the triggering by a sensor, for opening up an outlet opening 7 for a gas bag 8, so that this covering device moves essentially within an outer contour 15 of the air bag arrangement or of a vehicle part containing the air bag arrangement, and then a gas bag device is inflated with propellant by a gas generator 4 for the advancing into an occupant compartment of the vehicle.

10 Claims, 11 Drawing Sheets

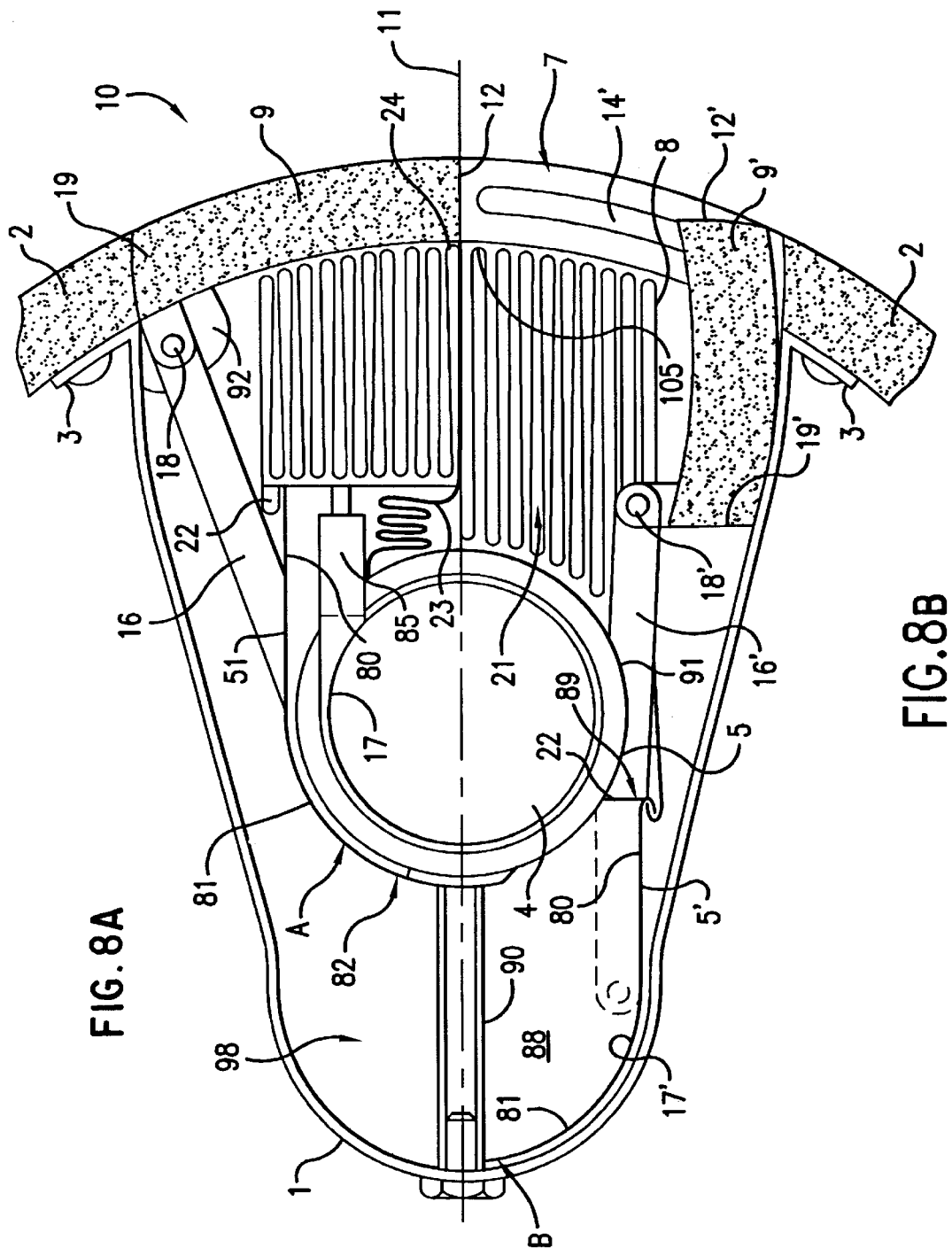

AIR BAG ARRANGEMENT AND TRIGGERING PROCESS THEREFOR

SPECIFICATION

The invention relates to an air bag arrangement, for example, for a vehicle, having a gas bag device which can be inflated by means of a propellant gas by a gas generator as the result of being triggered by a sensor. During the inflating, this gas bag device can be advanced into an occupant compartment of the vehicle or generally toward the position of a person to be protected.

An air bag arrangement of this type for protecting occupants in propulsion-type devices, such as particularly motor vehicles, is housed, for example, in the steering wheel in front of the driver's seat and/or in the dashboard in front of the front passenger's seat of a motor vehicle and is covered by a covering which is constructed, for example, as an interior plastic panelling. As known from practice, when the air bag arrangement is triggered, the opening air bag or gas bag blows the covering off toward the inside into the occupant compartment. This may injure the vehicle occupant, particularly if he is situated close to the air bag opening and the blown-off parts hit him in the face or at the neck at full force. Injuries of this type can also occur in the case of the gas bag system described in German Patent Document DE 40 22 881 C2 which has a cover flap covering the outlet opening for the gas bag and opening into the interior of the occupant compartment when the gas bag inflates and emerges through the opening.

It is an object of the present invention to improve an air bag arrangement and an operating process for its triggering such that the danger of injury to a vehicle occupant caused by the air bag arrangement is reduced.

According to the invention, this object is achieved by means of an air bag arrangement having the characteristics of claim 1 as well as, with respect to the process, having the characteristics of claim 6. The respective dependent claims relate to advantageous further developments of the invention.

The air bag arrangement according to the invention contains a covering device which, during the opening of the gas bag, moves at least not significantly into the occupant compartment, as in the case of known covering devices as the result of their blowing-off or by a folding about a hinge, whereby these known covering devices are moved completely toward a person to be protected, but which moves or is displaced approximately within the outer contour of a respective mounted part receiving the air bag arrangement, for example, upwards, downwards or sideways in the dashboard. This eliminates the injury potential of a covering which moves abruptly in the direction of the vehicle occupant.

The movable component is preferably driven by the propellant charge of the gas generator. However, the drive can also be provided by another energy source, as, for example, by a second explosive charge or the like. With respect to the time, the ignition of the energy source driving the movable component may take place before the ignition or at least the effect of the gas generator generating the filling gas so that the opening-up of the outlet opening for the gas bag begins before the start of the filling operation of the gas bag and preferably takes place to such an extent that the gas bag can expand unhindered in the desired direction toward the occupant position. As another alternative, the movable component can be acted upon by way of suitable devices by means of the filling gas and the latter can, when the covering devices, which may, for example, be formed by one or several cover flap(s), are at least partially opened up, be guided into the gas bag device or the air bag. In particular, it can be ensured in this manner that the covering devices can be withdrawn without any hindrance, for example, next to the housing space for the gas bag into the interior of the respective mounted part receiving the air bag arrangement, such as an air bag module or its housing. In this case, the covering flaps can be arranged, for example, laterally to the housing space in their withdrawn position.

In the inoperative position, the movable component can be without any connection with the covering device and may be coupled with it only when triggered. Since the covering flap(s) is/are preferably manufactured in one piece with a dashboard body which may, for example, be provided, its/their starting position, which exists when the air bag is not triggered, is secured. For example, by means of lasers or cutting knives, the covering flap(s), which can also be considered as a screen or screens, is/are "preseparated" such that when acted-upon by force, they separate according to the invention from the dashboard body. As an alternative, a firm coupling exists between the component and the covering device so that, in its inoperative position, the component can hold the covering device in a closed position in which its closes off an outlet opening for the gas bag.

The covering device, which bounds the air bag arrangement toward the occupant compartment or generally toward the position of a position (person?—translator) to be protected, is expediently guided on a guide such that a certain moving path of the covering device is defined when it opens up. As an alternative, the covering device can in this case move, be displaced, rotate or fold into different moving directions, moving essentially within the outer contour of the air bag arrangement or adjacent parts but not penetrating into the occupant compartment. Thus, the covering device may have screen-shaped elements which are linearly displaced or move radially away from one another. Preferably, the covering device contains one or several and particularly two covering flap(s) which is/are moved by the movable component into the interior of the air bag arrangement, in which case each covering flap carries out a swivelling movement.

The movable component is, for example, the housing of the gas generator which is guided in the air bag arrangement on a movement path and, after the ignition of the propellant charge, as a result of its movement, removes the covering flaps from the outlet opening for the gas bag. However, the moved component can also be driven or moved by another part, such as a piston or a rotary slide, in which case this other part can be moved by the propellant charge of the gas generator or by a separate drive.

The gas generator may be constructed as a hybrid generator which has additional ignition chambers filled with a solid explosive for igniting the gas and for breaking open the separating walls.

The air bag arrangement may have several gas generators with several gas bags which may form an individually controllable gas bag front, particularly in the case of multi-stage gas generators which have several successively ignitable propellant charges.

In order to construct the covering device to be suitable for a withdrawal, in the case of, for example, two covering flaps, as indicated above, the latter can be an integral component of, for example, a dashboard body which forms the forward front toward an occupant and which contains a dashboard support, a foam layer and a foil. The dashboard support, the foam layer and the foil are preferably "precut" by means of a laser or, for example, a laser-controlled cutting knife. Furthermore, the covering flaps are preferably connected, for example, by way of pull-back devices with the movable component and, in the event of its movement, for example, because of an ignition, are pulled out of the dashboard support and swivelled laterally particularly by way of guides so that they expose the outlet opening of the air bag.

In the case of a hard plastic dashboard, for example, made of polypropylene, the covering device can be injection-molded in one piece with the dashboard body. The separating points between the covering device and the dashboard body required during the withdrawal of the covering device can be produced by a corresponding thinning or weakening of the material, which is, for example, pressed in a zigzag shape preferably on the interior side, for example, by means of a laser beam.

A further development of the invention consists of provided control devices by means of which the gas pressure generated by the gas generator after triggering by the sensor is provided at first at least predominantly for driving the component and, only after a definable movement path or after a definable movement duration of the component, is provided completely for inflating the gas bag.

As a result, it is advantageously achieved that the covering device is opened in a reliable and fast manner before the gas bag is filled and therefore advances into the interior of the passenger compartment. A hindering of the inflating and advancing of the gas bag or air bag as a result of an opening of the covering device occurring too late or incompletely is therefore avoided.

Preferably, the control devices are further developed such that the gas pressure generated by the sensor triggering is provided at least almost completely, with the exception of no more than slight leakage losses, for the drive of the component and, only after a definable movement path or after a definable movement duration of the component, is provided completely for inflating the gas bag.

According to a preferred embodiment of the present invention, the control devices contain the component which is set in motion after the sensor triggering and is constructed and arranged such that, after the sensor triggering, it is first acted upon by the at least predominant portion of the gas pressure generated by the gas generator and releases the gas pressure only after a definable movement path or after a definable movement duration completely for inflating the gas bag. This type of construction is particularly efficient because the already existing component for the opening drive of the covering device is skillfully used simultaneously for controlling the opening of he covering device and for the inflating of the air bag. In this case, it is also particularly advantageous that automatically without any separate expenditure an optimal time period can be achieved for the opening of the covering device and the inflating of the air bag.

In the case of a preferably used further development of the above-mentioned construction, it is provided that the component set in motion after the sensor triggering with respect to the gas generator is developed and can be displaced such that, after the sensor triggering, it absorbs the at least predominant portion of the gas pressure generator by the gas generator until the outlet opening for the gas bag is opened sufficiently for an at least approximately unhindered advancing of the gas bag into the occupant compartment of the vehicle. This further development has the advantage that automatically without separate expenditures an optimal time period for the opening of the covering device and the inflating of the air bag is achieved.

A particularly simple and advantageously at the same time extremely effective and precise air bag arrangement can be achieved if the component for operating the covering device, which is set in motion after the sensor triggering, contains an adjustable cap or trough which at least essentially tightly surrounds the gas generator in the area of gas outlet openings for receiving the gas pressure from the gas generator along its adjusting path until the outlet opening for the gas bag for an at least approximately unhindered advancing of the latter into the occupant compartment of the vehicle is sufficiently opened up and will then completely release the gas pressure for inflating the gas bag. This further development requires no electric and/or electronic and even more complicated controls for letting the opening of the covering device and subsequently the inflating and the advancing of the gas bag into the vehicle interior take place with extreme precision.

Particularly preferably, the present invention can be used in the case of an air bag arrangement in which, in addition to the first gas generator, at least one other gas generator, and/or, in the gas generator several gas generator stages are provided which can be triggered successively. It will then be advantageous for the control devices to be designed such that the gas pressure for moving the component is provided only by the first gas generator or by the first gas generator stage of the gas generator.

The process for triggering an air bag arrangement, for example, in a vehicle, is distinguished by the fact that, as the result of a sensor triggering, first a covering device is driven by a component of the air bag arrangement for releasing an outlet opening for a gas bag which is set in motion after the sensor triggering so that the covering device moves essentially within the outer contour of the air bag arrangement or a vehicle component containing the air bag arrangement, and a gas bag device is inflated by a gas generator with propellant for the advancing into an occupant compartment of the vehicle.

An advantageous and therefore preferred further development consists of the fact that the gas pressure generated by the gas generator, after the sensor triggering, is first at least predominantly provided for driving the component and is only after a definable movement path or after a definable movement duration of the component provided completely for inflating the gas bag.

As in the case of the above-described arrangement, also in the case of the process, preferably essentially only leakage losses should be capable of reducing the gas pressure for opening the covering device.

Analogously to the above-mentioned further developments of the arrangement, additional implementations of the process and their modifications as well as the respective advantages are also obtained.

Additional advantageous and preferred further developments as well as their advantages are found in the respective dependent claims and their combinations.

In the following, the invention will be explained in detail by means of an embodiment with reference to drawings.

FIGS. 8A and 8B are one schematic longitudinal sectional view respectively of a sixth embodiment of the air bag arrangement with a drive for withdrawing the covering device before the withdrawal of the covering device (8A) and after the withdrawal of the covering device (8B);

Figure 9B:
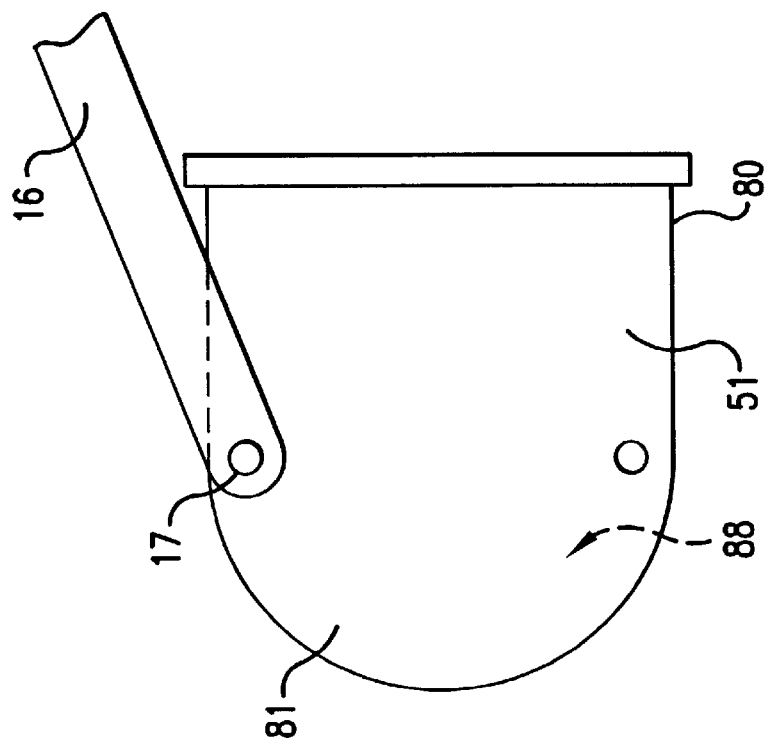
Figure 9A:
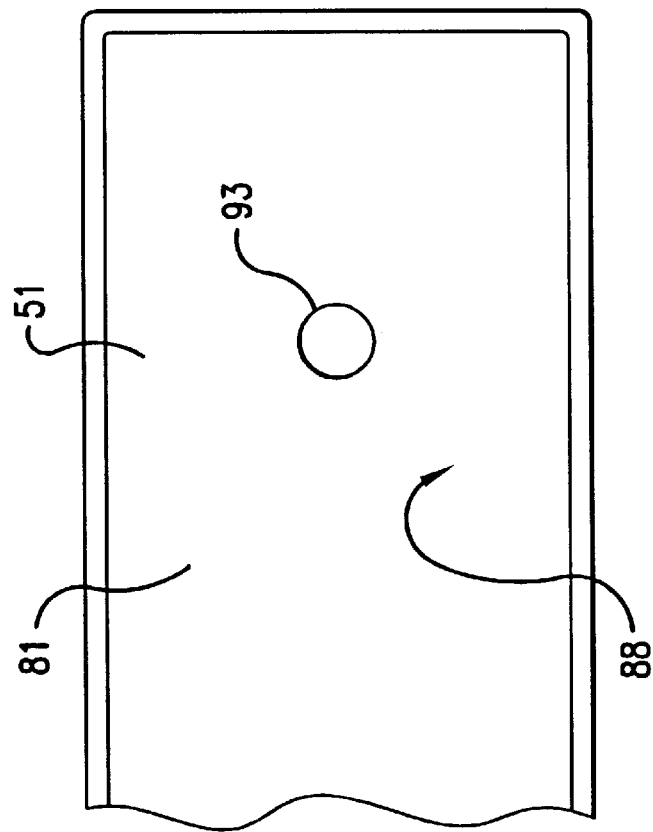
Figures 10A, 10B:
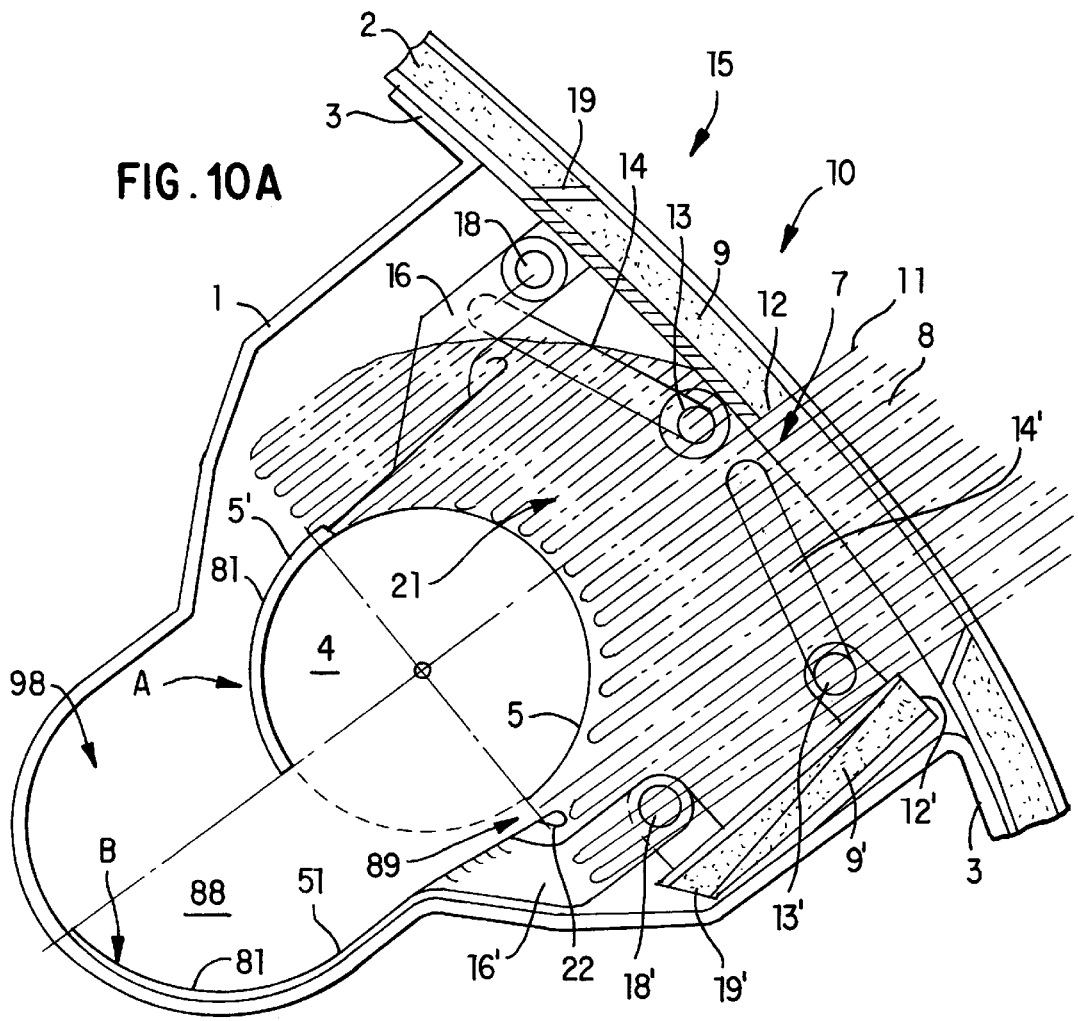
Figure 11:
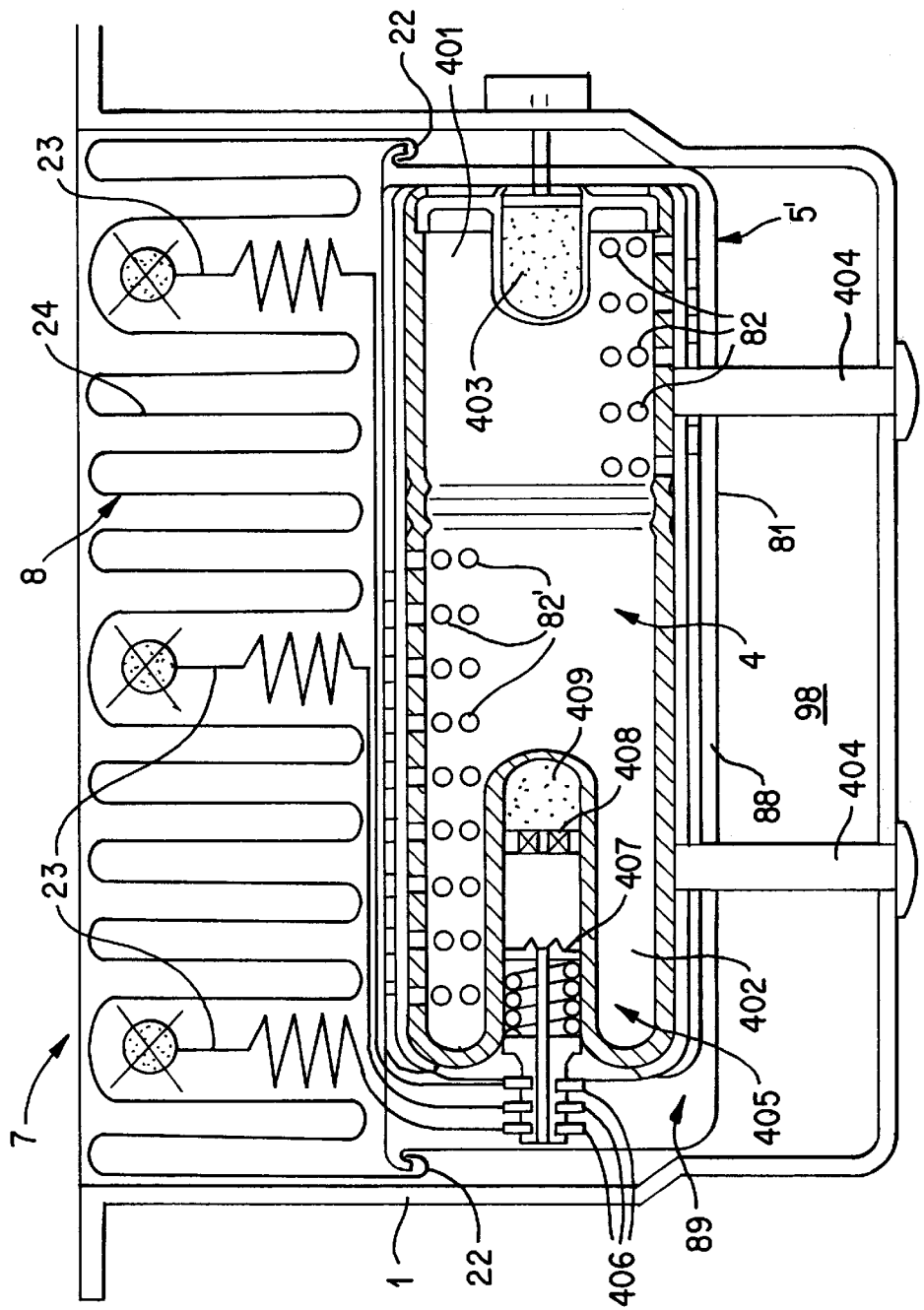

FIGS. 9A and 9B correspondingly are a schematic front and lateral view respectively of a component for driving the covering device in the case of the embodiment of the air bag arrangement according to FIGS. 8A and 8B;

FIG. 10A and FIG. 10B are schematic lateral sectional views of a seventh embodiment of the air bag arrangement with a drive for withdrawing the covering device before the withdrawal of the covering device (9A) and after the withdrawal of the covering device (9B); and FIG. 11 is a schematic longitudinal sectional view of an eighth embodiment of the air bag arrangement with a drive for withdrawing the covering device with a multi-stage gas generator.

In the drawing, all parts or combinations which are the same or similar or have the same or a similar effect have the same reference numbers in all figures, so that these parts or combinations as well as their functions are also easily understandable to a person skilled in the art in representations in which not all such parts or combinations as well as their functions are described in detail. In addition, a person skilled in the art can obtain additional details from the individual illustrations and representations of the drawing and particularly also from a comparative viewing of different figures, although these details are not illustrated and/or described separately.

The air bag arrangement which is generally concerned here may be situated, for example, on the front passenger's side in the dashboard in front of the front passenger's seat of the motor vehicle but is not limited to this application.

Figure 1:
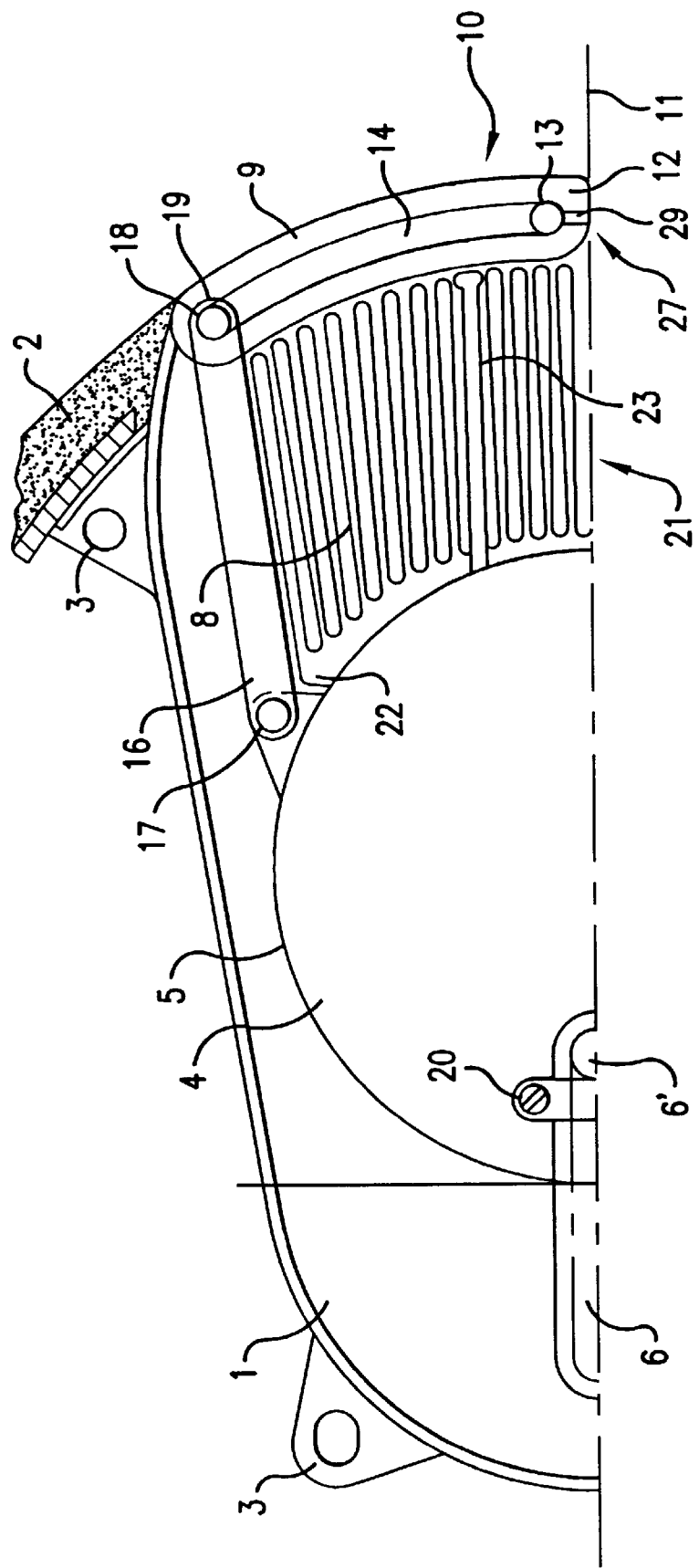
FIG. 1 is a lateral cross-sectional view of an upper half of a first embodiment of an air bag arrangement according to the invention in a starting or ready position.
Figure 2:
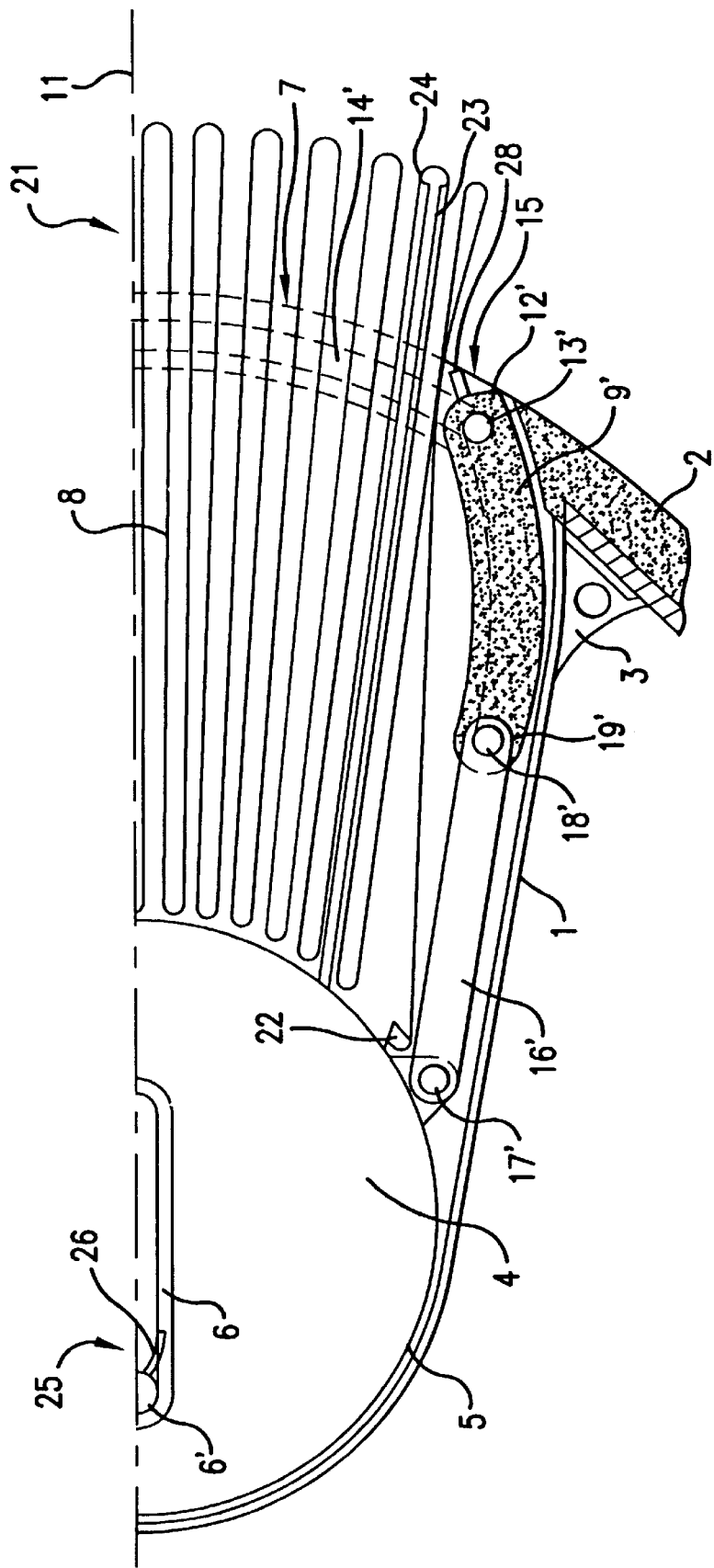
FIG. 2 is a lateral cross-sectional view of the lower half of the first embodiment of the air bag arrangement illustrated in FIG. 1 after the triggering of a gas generator in an end position of the movement.

An air bag arrangement according to the invention has a housing 1 which is housed in a dashboard 2 or an interior panelling in front of a front passenger's seat in the occupant compartment of a motor vehicle and is fastened by means of fastening straps 3 or the like. A gas generator 4 of a basically known construction (as described, for example, in German Patent Document DE 40 22 881 C2, European Patent Document EP 0 627 342 A1 or German Patent Application DE 197 03 945.6), which may also be constructed as a hybrid generator according to European Patent Document EP 0 607 671 A1, having, for example, a cylindrical gas generator housing 5, is contained in the air bag arrangement and is displaceably disposed by means of a schematically illustrated longitudinal guide 6 which is constructed, for example, as a connecting link guide and in which a pin 6' of the gas generator housing 5 engages so that the gas generator 4 is guided from a forward starting, inoperative or ready position (see FIG. 1) in a central location in the air bag arrangement into a rearward movement end position after the triggering and displacement (from the position in FIG. 1 to the left into the position of FIG. 2) by means of the propellant pressure.

An opening 7 of the air bag arrangement (see FIG. 2) for the emerging of of gas bag 8 which faces the vehicle occupant compartment or a person to be protected is closed in the ready or inoperative position (see FIG. 1) by an upper and a lower covering flap 9 and 9' of a covering device 10. The covering flaps 9, 9' adjoin one another with their respective edge area 12, 12' facing a central center plane 11 of the air bag arrangement. On the edge areas 12, 12', the covering flaps 9, 9' each contain respective pins 13, 13' which project on both sides of the covering flaps 9, 9' from these covering flaps 9, 9' (perpendicularly to the plane of the illustration of FIG. 1) and engage in recesses, such as slots or grooves 14, 14' in the housing 1 of the air bag arrangement. The grooves 14, 14' form two-sided guides for the pins 13, 13' and may extend in a straight or curved manner. In the embodiment, the grooves 14, 14' are adapted to the curved cross-sectional shape of the covering flaps 9, 9' and therefore extend along the outer contour 15 of the interior panelling or the dashboard 2.

An articulated connection in the form of a respective rod 16, 16' is provided between the gas generator 4 and each covering flap 9, 9', in which case each rod 16, 16' is linked on one side by way of a joint 17, 17' to the housing 5 of the gas generator 4 and on the other side by way of a joint 18, 18' is linked to the other edge area 19, 19' away from the center plane 11 which, on the top and the bottom, rests against the interior panelling 2, and therefore form a flexible lever connection between the gas generator 4 and the covering flaps 9, 9'. The rods 16, 16' hold the upper and lower edge areas 19, 19' of the covering flaps 9,9' in their position on the interior panelling 2 and therefore the covering flaps 9, 9' flush with the outer contour 15, while the gas generator 4 is secured in its inoperative or ready position by a sheet metal clasp 20 on the area of the longitudinal guide 6 which rotates away during the pressure build-up resulting from the propellant and permits the movement of the gas generator 4. As an alternative, plastic pins or the like can be provided on the gas generator 4 or on the covering flaps 9, 9' which, for inhibiting the movement, engage in a counterpart and are sheared off or broken off after the ignition of the gas generator 4 and thus permit a movement of the covering flaps 9, 9' and of the gas generator 4.

A gas bag device 21 of the air bag arrangement contains an air bag or a gas bag 8 whose bag edge 22 is fastened to the housing 5 of the gas generator 4 and which, in the folded condition, is housed in the space between the gas generator 4 and the covering flaps 9, 9'. The two rods 16, 16' may also be constructed as plate-shaped parts which represent an upper and a lower boundary of this space and, together with the lateral boundaries formed by the housing 1 of the air bag arrangement, form a shooting duct for the gas bag 8. A rope 23 is fastened as an ignition triggering device on the advanceable fabric 24 of the gas bag 8 and is connected with an ignition device (not shown) for a second driving stage of he gas generator 4. A triggering mechanism of this type for a multi-stage gas generator is described, for example, in German Patent Application DE 197 03 945.6 to which reference is made here.

When a sensor, which is not shown in detail and which, in particular, is vehicle-sensitive, determines an excessive vehicle speed change, as the result of a sensor triggering, an ignition charge and subsequently a propellant charge of the gas generator 4 are ignited in a known manner. Through openings (not shown) which can be torn open in the housing 5 of the gas generator 4 inside the bag edge 22 the propellant flows out toward the gas bag 8 which is therefore inflated and wants to unfold. The gas bag 8 presses against the still closed covering flaps 9, 9', whereby a reaction force acts in the opposite direction onto the gas generator 4, detaches it from its anchoring 20 and moves it to the left in its guide 6. This movement of the gas generator 4 is also promoted by a reaction force of the propellant flowing out of the gas generator 4. The moving gas generator 4 pulls by way of the two rods 16, 16' the two covering flaps 9, 9' on their upper and their lower edge 19, 19' toward the inside approximately along the interior side of the housing 1 of the air bag arrangement. In this case, the interior edge areas 12, 12' of the two covering flaps 9, 9' move, guided by the pins 13, 13', on the curved courses of the guides or grooves 14, 14' on the opening 7 into the end position (FIG. 2) in which the covering flaps 9, 9' are pulled completely into the air bag arrangement and have thus opened up the opening 7 for the emerging of the gas bag 8. The gas bag 8 can expand completely through the opening 7 into the vehicle occupant compartment. By means of a blocking device 25, the gas generator 4 is secured in its movement end position according to FIG. 2 so that it cannot jump back and forth because of its movement energy. The blocking device 25 may have a prestressed leaf spring 26 which is embedded in the guideway 6 such that the pin 6' can move in the guide 6 over the pressed-down leaf spring 26 which is then raised because of its prestressing and prevents a return movement.

The two covering flaps 9, 9' may have a coupling device 27 which holds the covering flaps 9, 9' in the closed inoperative position on their two mutually adjoining edge areas 12, 12' in a secure connection. This coupling device 27 contains, for example, a protruding nose or a pin 28 on one edge area 12' of the covering flap 9' which can engage in an assigned recess 29 on the other edge area 12 of the upper covering flap 9.

The described air bag arrangement may be situated, for example, on the front passenger's side in the dashboard in front of the front passenger's seat of the motor vehicle but is not limited to this application.

Figure 3A:
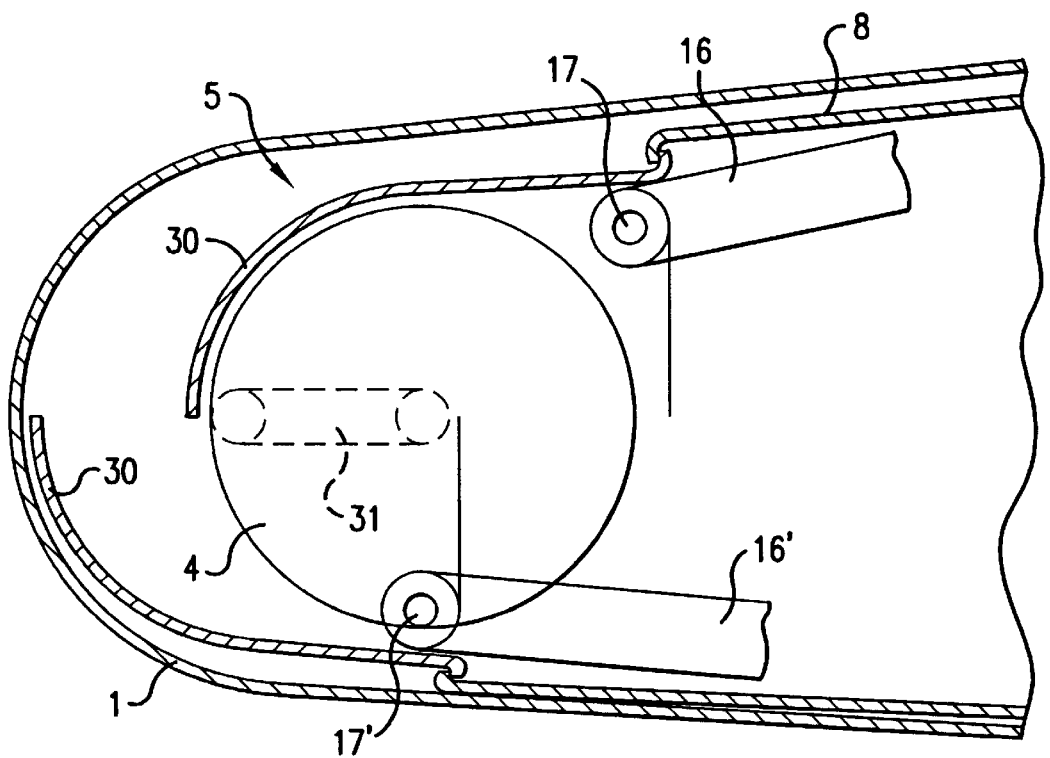
FIG. 3A is a sectional representation of a second embodiment for a drive for withdrawing the covering device.
Figure 3B:
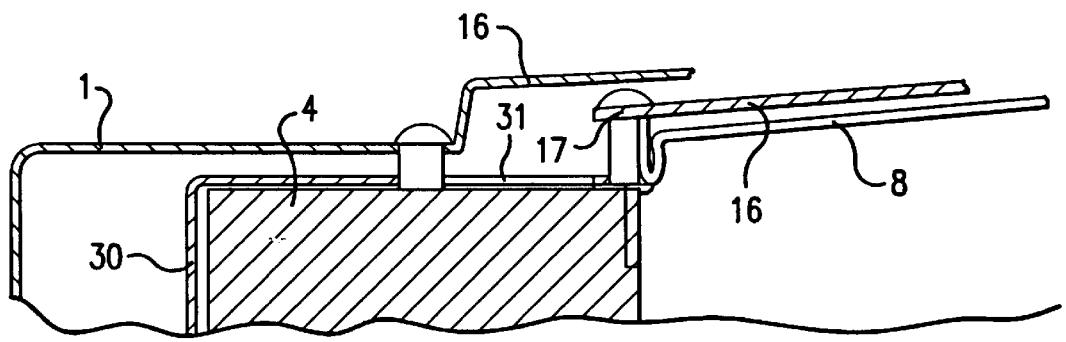
FIG. 3B is a top view of the second embodiment of FIG. 3A.

FIGS. 3A and 3B illustrate an embodiment of a driving device by means of which the covering device, particularly two covering flaps, can be withdrawn into the housing 1 of the air bag module. In the upper half of FIG. 3A, the driving device is illustrated in the inoperative position and, in the lower half, it is illustrated in the withdrawn position. In the embodiment, the gas generator 4 is stationarily arranged in the housing 1. Between the gas generator 4 and the housing 1, a free space is provided in the pull back direction into which a casing 30, which partially surrounds the gas generator 4, particularly in the manner of a half-shell, can be moved as the drivable component. The casing 30 is connected by way of rods 16 and 16' with the covering flaps, not shown in detail, of the covering device. The casing 30 can be driven into the withdrawn position by the gas pressure of the filling gas which is used for filling the gas bag 8 and is generated by the gas generator 4. For a linear guiding of the casing 30, guides can be provided in the form of slots 31. As a result, a linear guiding of the casing 30 is achieved with respect to the stationary generator 4. In the withdrawn position, the casing 30 is blocked by a blocking device which is not shown in detail. The gas bag 8 can be connected with the casing 30. In this manner, a single support device absorbs the reaction forces occurring during the withdrawing of the covering device as well as as during the expelling of the gas bag out of the outlet opening, in which case these mutually opposing reaction forces compensate one another completely or partially. In addition, in the case of this embodiment, only small masses are moved so that a short reaction time is achieved.

Figure 4B:
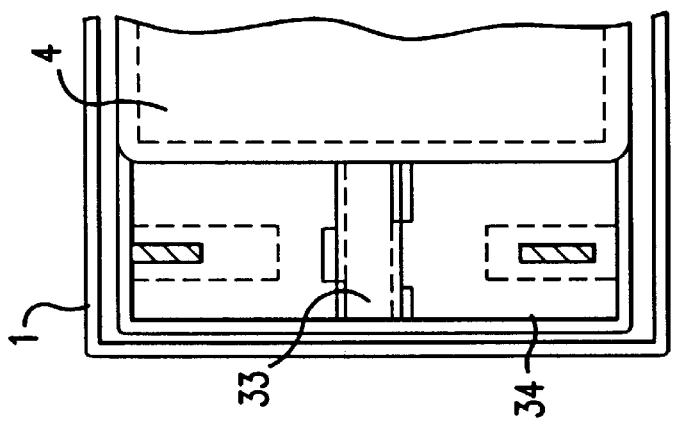
FIG. 4B is a sectional view of the third embodiment of FIG. 4A along the intersection line IV—IV in FIG. 4A.
Figure 4A:
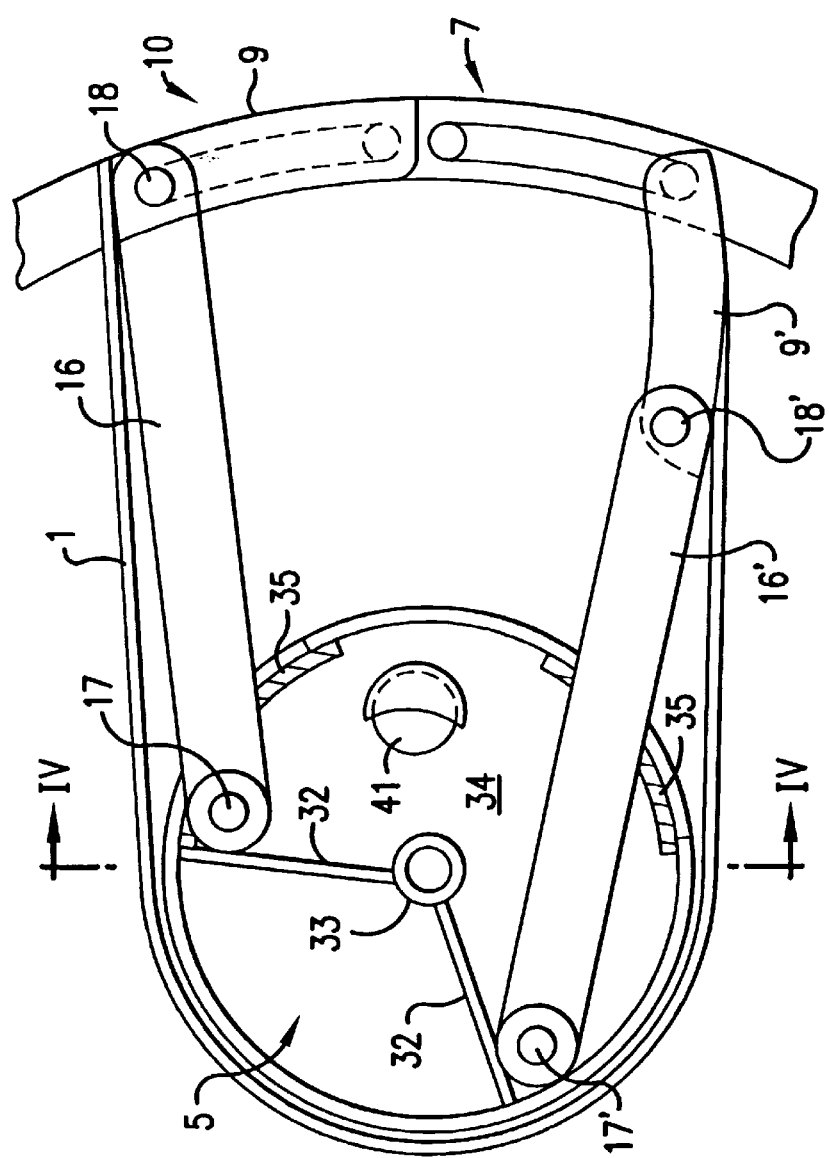
FIG. 4A is a view of a third embodiment for a drive for withdrawing the covering device.

In the embodiment illustrated in FIGS. 4A and 4B, the movable component 5 is formed by one or several rotary wings 32 (rotary pistons). In the embodiment illustrated in the figures, pressure chambers 34 are situated on both sides of the gas generator 4 in which two rotary wings 32 are disposed about an axis of rotation or rotary wing axis 33. The two rotary wings (piston wings) are disposed in the center of the respective cylindrical pressure chamber 34 on the joint rotary wing axis 33, as in a double hinge. The ends of the rotary wings 32 are connected by way of the rods 16, 16' and the joints 17, 17' as well as 18, 18' with the covering flaps 9,9' of the covering device 10.

A gas passage opening 41 is provided in each of the two pressure spaces 34. Through this opening, filling gas generated by the gas generator 4 can be introduced into the pressure spaces 34 for the rotary drive of the rotary wings 32. By means of the introduced pressure gas, the two rotary wings 32 are rotated from their inoperative position, which is illustrated in the upper half of FIG. 4A, into the withdrawn position, which is illustrated in the lower half 4A, about the common rotary wing axis 33. For opening up the outlet opening 7, the covering plates 9 and 9' are brought into a lateral position which is illustrated in the lower half of FIG. 4A. This lateral position is situated next to the housing space in which the gas bag is housed in the normal position.

Covering plates 35 may be provided on the rods 16, 16' for the pressure-tight covering of the rod passages.

Figure 5A:
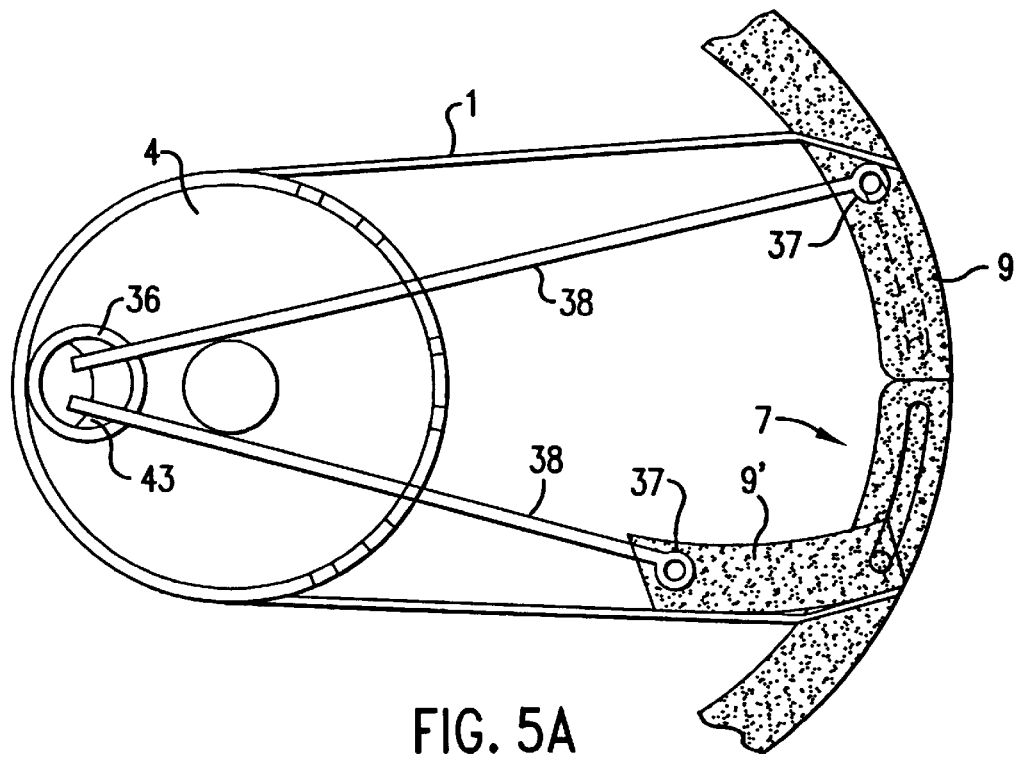
FIG. 5A is a lateral view of the fourth embodiment for a drive for withdrawing the covering device.
Figure 5B:
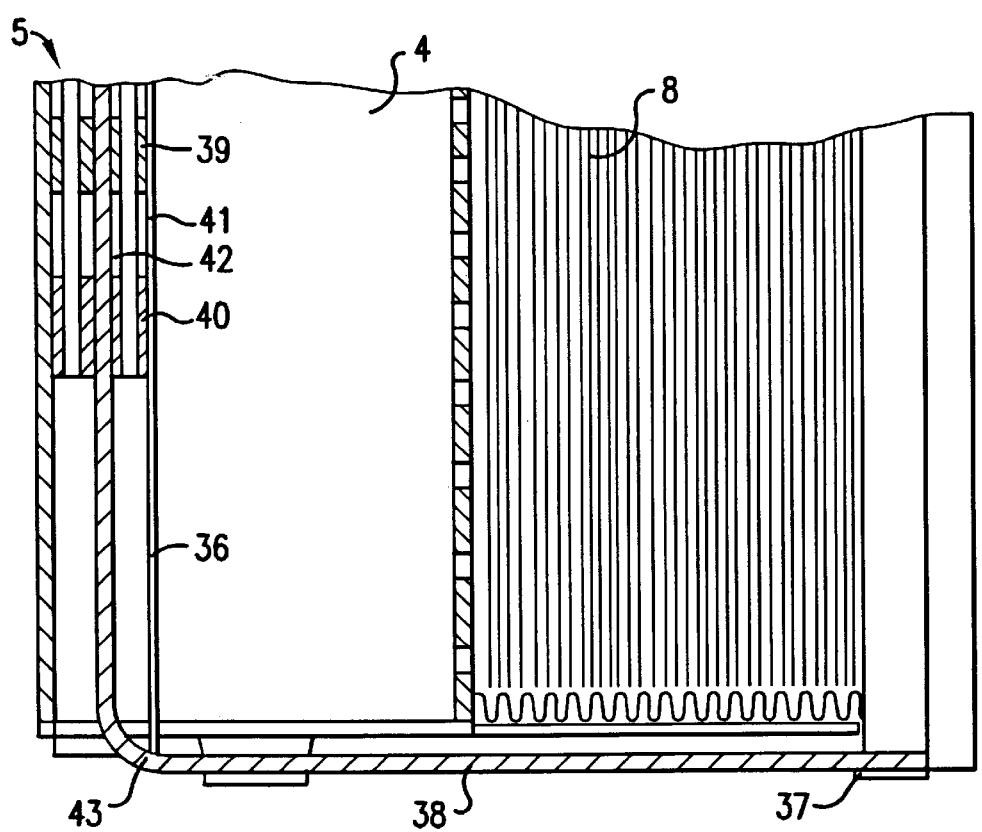
FIG. 5B is a top view of the fourth embodiment of FIG. 5A.
Figure 6:
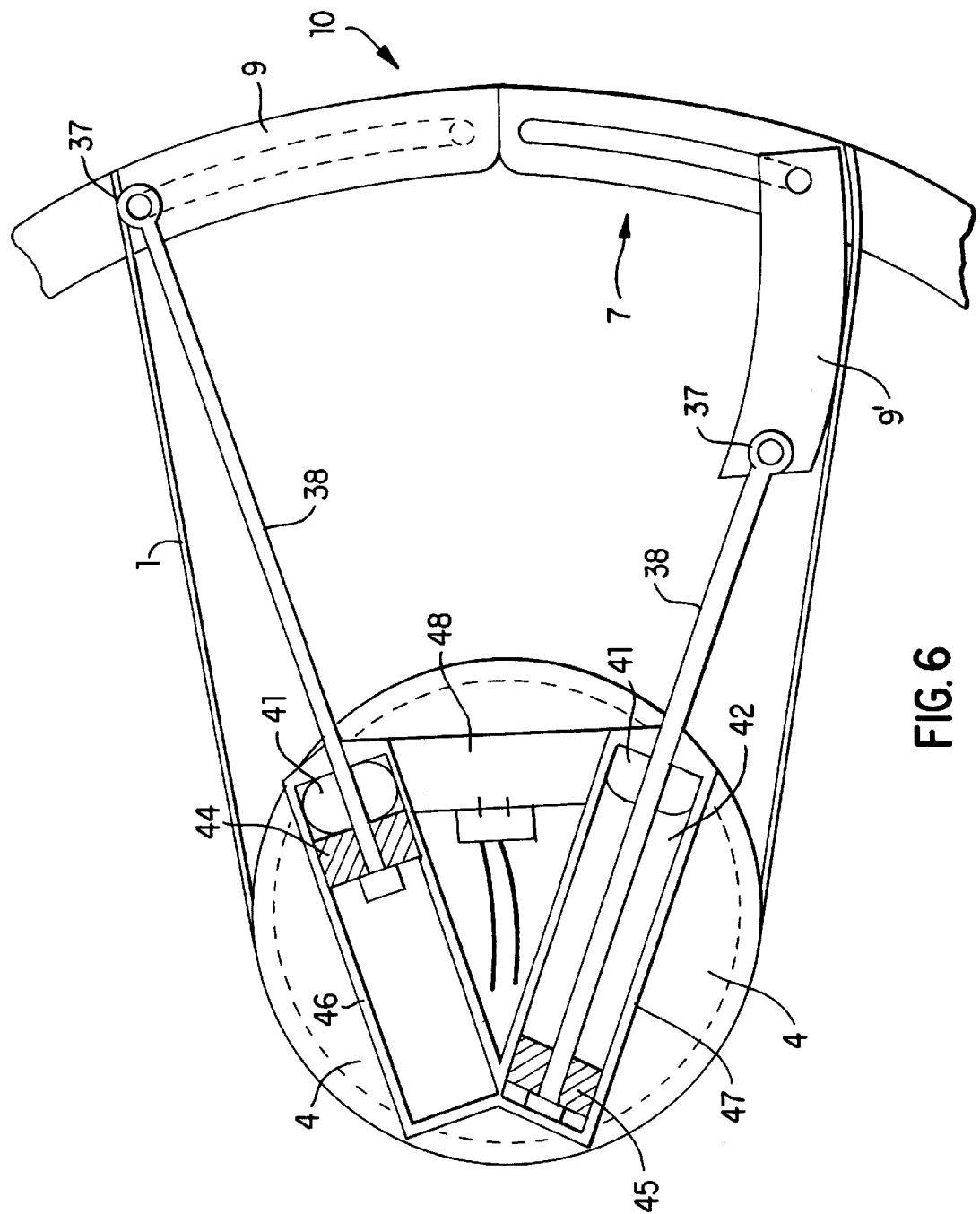
FIG. 6 is a lateral view of a fifth embodiment for a drive for withdrawing the covering device.

In FIGS. 5A, 5B and 6, embodiments are illustrated for a drive of the covering device in the form of linear piston cylinder arrangements. In the embodiment illustrated in FIGS. 5A and 5B, the component 5 driven for the opening-up of the outlet opening 7 is formed by a piston cylinder arrangement which has a guiding cylinder 36 in which two pistons 39 and 40 are guided which can be driven in opposite directions. The guiding cylinder 36 extends in parallel to the axis of the gas generator 4. Traction ropes 38, which are connected with the covering flaps 9, 9' of the covering device 10 at the connection points 37, lead out of both ends of the guiding cylinder 36. The guiding cylinder 36 may be arranged in the interior of the gas generator housing. A pressure space 42 is formed at the back sides of the two pistons 39 and 40. A pressure gas is introduced into this pressure space 42 for the linear drive of the pistons. This pressure gas can be formed by the filling gas which is generated by the gas generator 4. By way of the gas passage opening 41, this gas generated by the gas generator 4 can be guided into the pressure space 42. One or several traction ropes 38 can be connected with the respective piston 39 and 40. The traction ropes of the piston 39 are guided through corresponding openings in the piston 40, and the traction ropes of the piston 40 are guided through corresponding openings in the piston 39. At both cylinder ends, deflection surfaces 43 can be provided for deflecting the traction ropes 38. The upper half of FIG. 5A illustrates the inoperative position of the covering device, and the lower half illustrates the withdrawn position of the covering device. In the withdrawn position, the covering device is situated laterally on the wall of the module housing 1.

Instead of the pressure gas generated by the gas generator 4, a pressure gas can also be introduced into the pressure space 42 which is generated by a separate energy source, particularly a gas generator. Optionally, the pressure gas generated in the pressure space 42 can cause the ignition (pressure ignition) of the gas generator 4. As a result, it is ensured that the opening-up of the outlet opening 7 is initiated before the starting of the filling of the gas bag 8. In the embodiment illustrated in FIG. 6, pistons 44 and 45 are arranged in separate cylinders 46 and 47. On each face of the gas generator 4, two piston cylinder arrangements are provided. The guiding directions of the pistons 44 and 45 in the cylinders 46 and 47 correspond to the linear connection lines of the pistons with the connection points 37 on the covering flaps 9, 9' of the covering device. The upper half of FIG. 6 illustrates the inoperative position, and the lower half of FIG. 6 illustrates the withdrawn position of the arrangement.

The gas required for driving the pistons 44 and 45 is introduced into the pressure spaces 42. This may be the filling gas generated by the gas generator 4, the corresponding connection to the pressure spaces 42 being established by way of the gas passage openings 41.

However, it is also possible to provide a separate gas source 48 for the piston drive. This gas source, which may be electrically ignitable, can cause the ignition (pressure ignition) of the gas generator 4 for the filling of the gas bag 8.

Figure 7:
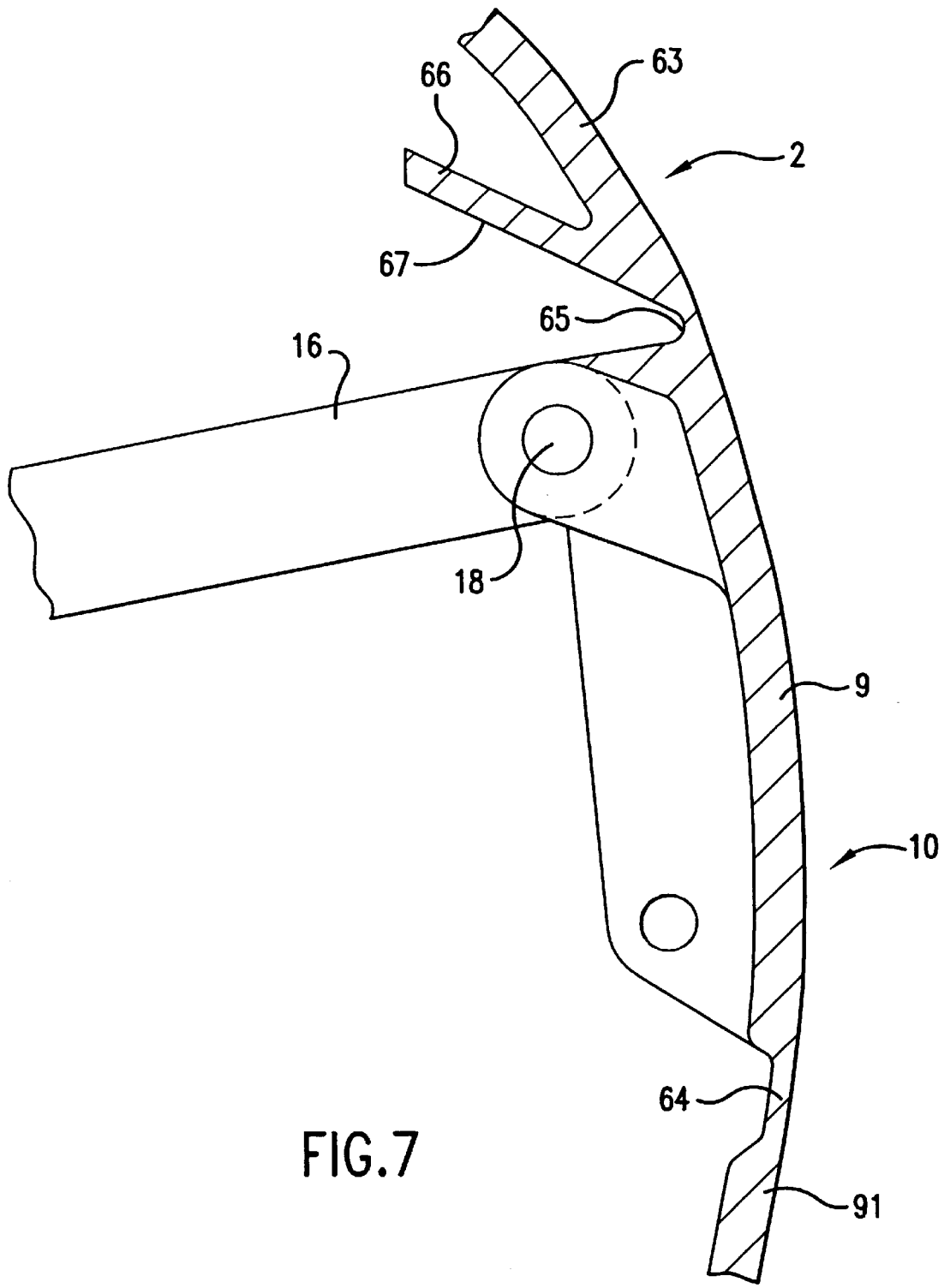
FIG. 7 is a view of an embodiment of a covering flap of the covering device which has a construction suitable for a withdrawal into the air bag module.

FIG. 7 illustrates an embodiment of a hard plastic dashboard with covering devices 10 or covering flaps 9 which have a construction suitable for a pulling-back into the air bag module. By means of the illustrated embodiment, a dashboard is achieved on whose exterior the separating lines between the covering devices and the dashboard body as well as between the covering flaps are not visible, in which case, however, a perfect separating of the covering device is ensured during the withdrawal from the dashboard.

The hard plastic dashboard consists, for example, of polypropylene. The dashboard body 63 as well as the covering flaps 9, 9' of the covering device 10 are made in one piece, particularly by injection molding. At the separating points, at which the covering device 10 is separated from the dashboard 63 during the withdrawal, desired breaking points 65 are created by a thinning of the material. In addition, desired breaking points 64 are provided between the covering flaps 9 and 9'. At the desired breaking points 64 and 65, additional incisions can be entered in a zigzag shape, for example, by means of a laser beam. By means of the above-described driving devices, the covering flaps can be withdrawn for the opening-up of the outlet opening. In the illustrated embodiments, preferably diagonal guiding surfaces 67 for the covering plates 9, 9' are provided on the dashboard supports 66 during the withdrawal into the interior of the dashboard or of the air bag module.

Preferably, the air bag arrangement can be constructed such that the reaction forces, which occur during the expelling of the gas bag from the air bag module, are opposed to the reaction forces which occur during the withdrawal of the covering device, particularly of the covering flaps. These mutually oppositely acting forces can be absorbed by a joint support device. In this manner, a compensation of the applied reaction forces can be achieved completely or partially.

An air bag arrangement according to the invention, which is illustrated in principle in FIGS. 8A and 8B in a sixth embodiment, has a housing 1 which is accommodated, for example, in a dashboard 2 or an interior panelling in front of a front passenger's seat (not shown) in the vehicle occupant compartment (not shown) of a motor vehicle (not shown) and is fastened by means of fastening straps 3 or the like. A gas generator 4 as well as optionally a second gas generator 4' for a, for example, two-stage air bag arrangement of a basically known construction (as described, for example, in German Patent Document 40 22 881 C2, European Patent Document EP 0 627 342 A1 or German Patent Application DE 197 03 943.6 whose full content is included in the present document by this reference), in which case the two-stage or multi-stage triggering can also be implemented by a two-stage or multi-stage gas generator (see FIG. 11 below), which may also be constructed as a hybrid generator according to European Patent Document EP 0 607 671 A1, which is also fully included int he disclosure content of the present documents, having, for example, a cylindrical gas generator housing 5, is stationarily mounted in the air bag arrangement.

An opening 7 of the air bag arrangement facing the vehicle occupant compartment or a person for the emerging of a gas bag 8 is closed off by an upper and a lower covering flap 9, 9' of a covering device 10 in the ready or inoperative position (see, for example, FIG. 8A). The covering flaps 9, 9' adjoin one another by means of their respective edge area 12, 12' facing a central center plane 11 of the air bag arrangement. On these edge areas 12, 12', for example, pins 13, 13' are assigned to each covering flap 9, 9' and project on both sides of the covering flaps 9, 9' with respect to these covering flaps 9, 9' and engage in recesses, such as slots or grooves 14, 14' in the housing 1 of the air bag arrangement. The grooves 14, 14' form guides on both sides for the pins 13, 13' and may extend in a straight or curved manner. The grooves 14, 14' may be adapted to the curved cross-sectional shape of the covering flaps 9, 9' and therefore extend in parallel to the outer contour 15 of the interior panelling or of the dashboard 2. However, the pins 13, 13' may also be mounted directly on the covering flaps 9, 9', as indirectly also illustrated in FIG. 8B, in which the groove 14' for the pin 13' is clearly visible as the result of the opened covering flap 9'.

An articulated connection, which may contain, for example, one rod 16, 16' respectively, may be provided between the gas generator 4 and each covering flap 9, 9' (FIG. 8A and 8B), in which case each rod 16, 16' is linked, on the one hand, by way of a joint 17, 17' to a component 5' which is movable, for example, displaceable with respect to the gas generator and, on the other hand, is linked by way of a joint 18, 18' to the other edge area 19, 19' of the covering flaps 9, 9' away from the center plane 11, which edge area 19, 19' rests on the top and on the bottom against the interior panelling 2 and therefore forms an articulated lever connection between the component 5' and the covering flaps 9, 9'. The rods 16, 16' hold the upper and the lower edge areas 19, 19' of the covering flaps 9, 9' in their position on the interior panelling 2 and thus the covering flaps 9, 9' flush with the outer contour 15, while, in its inoperative or ready position A, the component 5' can be secured in the area of its preferably provided longitudinal guide. The rods 16, 16' may also be fixedly connected with the component 5' which will be described in detail below, as long as they ensure an appropriate guiding of the covering flaps 9, 9' from their inoperative or ready position A, into the opened-up position B.

A gas bag device 21 of the air bag arrangement contains an air bag or gas bag 8 whose bag edge 22 is fastened to the component 5' and which, in the folded condition, is housed in the space between the gas generator 4 and the covering flaps 9, 9'. The two rods 16, 16' may also be formed as plate-shaped parts which represent an upper and a lower boundary of this space and, together with the lateral boundaries formed by the housing 1 of the air bag arrangement, form a shooting duct for the gas bag 8. A rope 23 is fastened as an ignition triggering device on the advanceable fabric 24 of the gas bag 8 and is connected with an ignition device 86 for a second driving stage in the form of the second gas generator 4'. Such a triggering mechanism for a multi-stage gas generator 4, 4' is described, for example, in the German Patent Applications DE 197 03 945.6 and DE 197 09 257.8, to which reference is made here, whereby their disclosure content is fully included in the present documents.

When a sensor, which is not shown in detail and which, in particular, is sensitive to the driving situation, determines an excessive vehicle speed change, by means of a sensor triggering, in the known manner, for example, an ignition charge of a, for example, electric igniter 85 is ignited and, as a result, subsequently a propellant charge of the gas generator 4 is ignited. The ignition charge 85, as also the ignition device 86 of the second gas generator 4', may be an ignition charge which can be triggered electrically or an ignition charge which can be triggered mechanically, in which case the mechanical triggering may be able to be activated electrically. Only as an example, reference is made here to German Patent Document DE 197 15 463.8 which relates to an ignition device for an air bag arrangement and whose whole disclosure content is hereby included in the present documents. It is preferable for the ignition 85 of the first gas generator 4, as the first stage, to be triggered electrically and for the ignition 86 of the second gas generator 4', as the second, later ignited stage, to be triggered mechanically.

It is possible that the propellant flows out through the opening (not shown), which can be torn open, in the housing 5 of the gas generator 4 within the bag edge 22 toward the gas bag 8 which therefore would be inflated and could unfold, which can also be provided according to other, previously described embodiments. The gas bag 8 would then press against the still closed covering flaps 9, 9' (position A), whereby the reaction force acts in the opposite direction onto the gas generator 4, which must then, however, be arranged to be displaceable, and would move it in a guide toward the left (compare FIG. 8A). Such a movement of the gas generator 4 would also be promoted by a reaction force of the propellant flowing out of the gas generator 4. A gas generator 4 which moves in this manner, by way of two rods 16, 16', could pull the two covering flaps 9, 9' on their upper and lower edge 19, 19' toward the inside approximately along the interior side of the housing 1 of the air bag arrangement. In this case, the interior edge areas 12, 12' of the two covering flaps 9, 9', guided by the pins 13, 13' then move on the curved paths of the guides or grooves 14, 14' on the opening 7 into the end position B (compare FIG. 8B) in which the covering flaps 9, 9' are pulled completely into the air bag arrangement nd thus have exposed the opening 7 for the emerging of the gas bag 8. The gas bag 8 can then expand completely through the opening 7 into the vehicle occupant compartment. By means of a blocking device, the gas generator 4 could be secured in its movement end position so that it cannot be jump back and forth because of its movement energy.

The two covering flaps 9, 9' may have a coupling device (not shown) which holds the covering flaps 9, 9' in the closed inoperative position A on their two adjoining edge areas 12, 12' in a secure connection. The coupling device may, for example, contain a projecting nose or a pin on one edge area 12' of the covering flap 9' which can engage in an assigned recess on the other edge area 12 of the upper covering flap 9.

However, FIGS. 8A and 8B illustrate an embodiment of a driving device by means of which the covering device 10, particularly the two covering flaps 9, 9' can be withdrawn into the housing 1 of the air bag module in a manner which differs from the above-described manner. In the upper half of the illustration, that is, in FIG. 8A, the driving device is illustrated in the inoperative position A and, in the lower half, thus in FIG. 8B, it is illustrated in the withdrawn position B.

In this embodiment as well as in the following embodiments, as described above, the gas generator 4 is stationarily arranged in the housing 1. Between the gas generator 4 and the housing 1, a free space 98 is provided in the withdrawal direction in which a casing in the form of a cap or a trough 81 which partially, particularly in the manner of a half-shell, surrounds the gas generator 4, can be moved as a drivable component 5'. The cap or trough 81 is connected with the covering flaps 9, 9' of the covering device 10 by way of rods 16 and 16' (for example, FIG. 8A, 8B). The cap or trough 81 can be driven into the withdrawn position by the gas pressure of the filling gas used for filling the gas bag 8 which was generated by the gas generator 4.

For a linear guiding of the cap or trough 81, guides can be provided in the form of slots (not shown). As a result, a straight guiding of the cap or trough 81 is achieved with respect to the stationary generator 4. For example, the pins of the joints 18, 18' can also be used as a suitable guide. In the withdrawn position, the cap or trough 81 is blocked by a blocking device which is not shown in detail. The gas bag 8 is connected with the cap or trough 81. In this manner, the reaction forces occurring during the withdrawal of the covering device as well as during the expelling of the gas bag 8 are absorbed by a single support device, in which case these mutually opposed reaction forces compensate one another completely or partially. Also, in this embodiment, only small masses are moved so that a short reaction time is achieved.

The special characteristic of the cap or trough 81 consists of the fact that it operates, on the one hand, as a driving device for the covering device 10 and, on the other hand, simultaneously takes over the function of control devices 80 to which it therefore belongs. The component 5' for operating the covering device 10, which is set in motion as the result of the sensor triggering and which, in the embodiment discussed here, contains the adjustable trough 81, surrounds the gas generator 4 in the area of gas outlet openings 82 for receiving the gas pressure from the generator 4 by way of its adjusting path while forming a gas receiving space 88 in an at least essentially tight manner until the outlet opening 7 for the gas bag 8 is sufficiently opened for an at least approximately unhindered advancing of the latter into the occupant compartment of the vehicle. Only then will the adjustable cap or trough 81 completely release the gas pressure between itself and the gas generator 4 to pass through for inflating the gas bag 8.

As the result of the fact that the first gas generator 4 has gas outlet openings 82 only into the cap or trough 81, after the ignition of the first gas generator 4, at first only the cap or trough 81, while enlarging the gas receiving space 88, will be pushed away from the first gas generator 4, specifically to such an extent that a gap or channel 89 is created between the cap or trough 81 and the first gas generator 4 while opening the gas receiving space 88, through which gap or channel 89 the propellant can enter into the gas bag or air bag 8 and can inflate it. In this case, at least essentially, that is, with the exception of no more than low leakage losses, the whole propellant is first used for adjusting he cap or trough 81 and therefore the covering device 10 is opened up first before the gas bag 8 is inflated and as a result advanced into the vehicle occupant space (not shown).

The thus constructed air bag arrangement contains two gas generators 4, 4' for a two-stage triggering of the air bag 8. As an alternative, a gas generator 4 with two successively triggerable stages can also be used for this purpose. The first ignition preferably takes place electrically by means of an electric ignition device 85. The rope 23 (see FIG. 8A) is used for triggering the second ignition by means of a mechanical ignition device 86. By way of a fastening 90, the gas generators 4, 4' are supported on the housing 1 of the air bag arrangement.

As the result of the fact that the delivery of the first gas generator 4 takes place only into the cap or trough 81 which can also be called a pressure cap or pressure trough, which, therefore, until the gap or channel 89 is formed between it and the gas generator, is displaced away from the latter, the advantage is achieved that the covering flaps 9, 9' of the covering device 10 will definitely open up first, and only then the air bag 8 itself will receive pressure for its inflating through the gap or channel 89. In the embodiment discussed here, this characterizes the corresponding process for triggering the air bag arrangement.

Only for the purpose of completeness, it is also pointed out that the gas generators 4, 4' each contain or jointly contain a sieve 91 which holds bag explosion fragments (not shown) and similar parts so that they cannot penetrate into the air bag 8 and damage this air bag 8. The sieve 91 has the additional function of preventing the explosion fragments (not shown) or similar parts from clogging the gap or channel 89, which clogging would lead to a malfunctioning of the air bag arrangement. On the one hand, this may possibly prevent the complete opening of the covering device 10 in that a jamming of the cap or trough 81 with the gas generators 4, 4' could occur as the result of the explosion fragments (not shown) or similar parts, and, on the other hand, the inflating of he gas bag 8 could be prevented or slowed down as a result, which would keep the air bag 8 from being available in time for protecting the occupant. FIG. 8A also shows an opening 92 for mounting the fastening of the rods 16, 16'.

The pressure trough or, in general, the cap or trough 81, as the component 5' which can be moved by the sensor triggering, is illustrated in FIGS. 9A and 9B in a partially frontal view or a lateral view. FIG. 9A shows a passage hole 93 for the fastening of the generators 4, 4'. The pressure trough 81 encloses the generator housing 5 as tightly as possible on all sides; that is, so that the gas outlet openings 82 of the first generator 4 at first lead only into the gas receiving space 88 between the pressure trough 81 and the gas generators 4, 4'. This means that the first generator 4 or a first stage of an individual generator 4 has only an opening into the trough 81. The full pressure can flow into the air bag 8 itself only after the trough 81 is pushed back.

Another embodiment is illustrated in FIGS. 10A and 10B and differs from the variant according to FIG. 8A and 8B essentially by the construction of the coupling of the trough-shaped component 5' and of the covering device 10 as well as the guiding of the opening movement of the latter. As far as in FIGS. 10A and 10B the same parts and functions are illustrated as in FIGS. 8A and 8B, for avoiding repetitions, reference is made to the description of the latter which should therefore be used analogously for the description of the embodiment according to FIGS. 10A and 10B.

Another embodiment is illustrated in FIG. 11, which, in contrast to the previous embodiments, relates to a two-stage generator 4 which contains a first generator stage 401 and a second generator stage 402 which are easily recognizable in the illustration. For the purpose of a simplification, parts and their functions which were already described earlier in conjunction with other embodiments will not be explained again by means of FIG. 11 but reference is made in this respect to the corresponding above-mentioned embodiments. For the purpose of clarity, the covering device 10 and its coupling to the movable component 5 in the form of a casing 5 were omitted in FIG. 11.

The first stage 401 of the two-stage generator 4 has an electrically ignitable ignition cartridge 403 by means of which it can be triggered as a function of the driving situation. The gas outlet openings 82, which lead away from the outlet opening 7 for the air bag 8, are clearly visible in the first stage 401. In its area facing away from the outlet opening 7 for the air bag 8, the whole gas generator 4 is surrounded such by a trough 81 as the casing 5', which along guides 404 can be moved away from the outlet opening 7 for the air bag 8, that the gas outlet openings 82 are directed into the trough 81. When the electrically ignitable ignition cartridge 403 and, as the result, the first generator stage 401 is triggered, the resulting generated gas presses through the gas outlet openings 82 into the trough 81 which, in turn, as the result of the gas pressure, is moved along the guides 404 away from the gas generator 4. For example, in a form implemented in the above-discussed constructions, the covering devices 10 (not shown in FIG. 11) of the outlet opening 7 for the air bag 8 are coupled to the trough 81 such that the latter, by means of its movements as the result of the gas pressure, operates the covering devices 10 in the sense of an opening-up of the outlet opening 7 for the air bag 8.

In the housing 1 of the air bag arrangement, a free space 98 is provided in the withdrawal direction or generally in the movement direction of the trough 81, into which free space 98 the trough 81 moves when acted upon by the gas pressure from the first stage 401 of the gas generator 4. The trough 81 is adapted to the dimensions and the shape of the gas generator 4 such that, after a movement path of the trough 81 which can be defined by this adaptation, preferably when the latter reaches an end position on the end of the free space 98 facing away from the gas generator 4, a gap or channel 89 is created between the trough 81 and the gas generator 4, through which gap or channel 89 the propellant can enter into the gas bag or air bag 8 and can inflate it. Preferably, at least essentially, that is, with the exception of no more than low leakages losses, the whole propellant can first be used for adjusting the cap or trough 81 and thus first the covering device 10 is opened up before the gas bag 8 is inflated and therefore advanced into the vehicle occupant space (not shown). As an alternative, the air bag 8 can be inflated at least partially simultaneously for displacing the trough 81.

Three ropes 23 are fastened as ignition triggering devices on the advanceable fabric 24 of the gas bag 8 at different (points?—translator) and are connected with an ignition device 405, similar to the electric igniter 85 according to FIG. 8A, for the second driving stage 402 of the gas generator 4. When, by means of the gas of the first generator stage 401, after it was used to displace the trough 81 and therefore the covering device 10 was opened up, the air bag 8 can unhindered expand beyond a condition in which the three ropes 23 are all tensioned, as the result of this movement energy, a securing pin 406 is pulled out of the ignition device 405 by each of the three ropes 23, whereby, virtually in the form of an AND-circuit, a prestressed ignition pin 407 is released and strikes upon a percussion-type ignition triggering device 408 which, for increasing the operational reliability, are each constructed twice, of an ignition cartridge 409 which can therefore be triggered mechanically. Then the second generator stage 402 will be triggered and the gas generated by the latter will flow out through the gas outlet openings 82' and further inflate the air bag 8.

The above-described function and construction of the air bag arrangement according to FIG. 11 is not limited to the concrete embodiment. Thus, a gas generator 4 with more than two generator stages can also be used, in which case, for example, ropes are used for the triggering of subsequent stages which have correspondingly larger lengths than the lengths of those ropes by means of which the respective preceding stage was triggered. A "soft" inflating of the air bag can therefore be achieved, whereby the risk of injury to a person exposed to the inflating air bag is reduced since that person, if he comes too close to the inflating air bag, is not automatically subjected to the full force of all gas still to be generated by the gas generator, but the generating of gas can be stopped at any time by the person's contact with the air bag in that subsequent, not yet triggered generator stages are no longer triggered. For example, a different number of ropes than three per generator stage can also be used. Furthermore, the second stage and additional stages of the gas generator can be triggered by electrically triggerable igniters in that, for example, corresponding electric switches are operated by the ropes. Instead of being detected by the ropes, air bag conditions can also be detected by other devices and, as a function thereof, additional generator stages can either be triggered or not.

The above-mentioned characteristics and combinations of characteristics and those shown in the drawings of all discussed embodiments are used only for explaining examples of the invention and do not limit the invention. The disclosure content of all present documents is determined by what particularly a person skilled in the art can easily recognize in the claims but also in the description and in the drawing. The disclosure content of the present documents of the invention also includes the contents of all earlier applications and other publications cited herein.

I claim:

1. Air bag arrangement for a vehicle comprising:
   a gas bag device which can be inflated by propellant gas,
   a gas generator which generates the propellant gas,
   a sensor which triggers the gas generator, said gas bag device, while inflating, advancing into an occupant compartment of the vehicle, and
   a covering device which is driven by a component of the air bag arrangement which is set in motion after triggering by the sensor and which opens up an outlet opening for a gas bag and moves essentially within an outer contour of the air bag arrangement or a vehicle part containing the air bag arrangement.

2. Air bag arrangement according to claim 1, wherein the component is driven as a result of gas pressure generated by the gas generator, wherein the gas generator is a multi-stage gas generator which can be triggered by a driving device affecting the driven component, and wherein the covering device includes at least two covering flaps and/or, after opening-up of the outlet opening, is positioned within an air bag module housing wall, in a receiving space, in which the gas bag is situated in an inoperative position before triggering of the air bag arrangement, in which the air bag arrangement is guided on a guide and/or has elements which open in the manner of a screen and which carry out a swivelling movement.

3. Air bag arrangement according to claim 1, wherein the component, which is driven by a reaction force formed when gas flows out of the gas generator, is held in a movement end position by a blocking device,
   wherein the movable component carries out a rotational and/or a translational movement for operating the covering device and the movable component is guided in a longitudinal guide in the air bag arrangement,
   wherein the movable component contains a piston, a rotary slide and/or the gas generator which is disposed to be movable in the air bag arrangement, or is constructed as a casing which tightly encloses said gas generator, before being acted upon, and which can be driven by the gas pressure generated by the gas generator for a linear movement and is connected with the gas bag,
   wherein the drivable component is constructed as at least one rotary wing or piston which can be caused to rotate about an axis of rotation and, on both sides of the gas generator, pressure chambers are provided, and in each pressure chamber said at least one rotary wing or piston is provided, or
   wherein the drivable component is constructed as linearly drivable pistons guided in a cylinder, two pistons being provided which can be driven in opposite directions and which are guided in at least one cylinder or in separate cylinders, the pistons being drivable by a propellant which can be ignited on the pressure side of the respective piston.

4. Air bag arrangement according to claim 1, wherein the covering device consists of a hard plastic material, which is formed in one piece with a dashboard body also made of a hard plastic material, and desired breaking points formed as a thinning of material, which are separated when the outlet opening is opened up, are provided between the covering device and the dashboard body.

5. Air bag arrangement according to claim 1, and further comprising control devices provided by which the gas pressure generated by the gas generator, after triggering by the sensor, is first used at least predominantly for driving the component and, only after a definable movement path or after a definable movement duration of the component, is provided completely for inflating the gas bag, and in that the control devices contain the component set in motion after the triggering by the sensor, which component is constructed and arranged such that, after the triggering by the sensor, it is first acted upon by the at least predominant part of the gas pressure generated by the generator and releases the latter only after a definable movement path or after a definable movement duration completely for inflating the gas bag,
   wherein the component set in motion after the triggering by the sensor is further developed and displaceable with respect to the gas generator such that, after the triggering by the sensor, it absorbs the at least predominant part of the gas pressure generated by the gas generator, until the outlet opening for the gas bag is sufficiently opened up for an at least approximately unhindered advancing of the latter into the occupant compartment of the vehicle, and
   wherein the component set in motion after the triggering by the sensor, for operating the covering device, contains an adjustable cap or trough which essentially tightly encloses the gas generator in the area of the gas outlet openings for receiving the gas pressure from the gas generator along its adjusting path until the outlet opening for the gas bag is sufficiently opened up for at least an approximately unhindered advancing of the latter into the occupant compartment of the vehicle and then releases the gas pressure completely for inflating the gas bag, and wherein, in addition to the first gas generator, at least one additional gas generator and/or, in the gas generator, several gas generator stages are provided which can be triggered successively, and the control devices are designed such that gas pressure for moving the component is provided only by the first gas generator or by the first gas generator stage of the gas generator.

6. Process for triggering an air bag arrangement for a vehicle comprising the steps of:

triggering a sensor, driving a covering device by a component set in motion after triggering the sensor, for opening up an outlet opening for a gas bag so that the covering device moves within an outer contour of the air bag arrangement or a vehicle part containing the air bag arrangement, and inflating a gas bag device with a propellant by a gas generator for advancing into an occupant compartment of the vehicle.

7. Process for triggering an air bag arrangement according to claim 6, wherein the gas pressure generated by the gas generator, after the triggering by the sensor, is first at least predominantly provided for driving the component and, only after a definable movement path or after a definable movement duration of the component, is provided completely for inflating the gas bag.

8. Process for triggering an air bag arrangement according to claim 6, wherein, after triggering by the sensor, the component is first acted upon by the at least predominant portion of the gas pressure generated by the gas generator and completely releases the latter only after a definable movement path or after a definable movement duration for inflating the gas bag.

9. Process for triggering an air bag arrangement according to claim 6, wherein a pressure surge takes place from the gas generator for moving the component and then the built-up pressure is transmitted into the gas bag.

10. Process for triggering an air bag arrangement according to claim 6, wherein, for acting upon the component set in motion after triggering by the sensor, only a first generator and/or a first generator stage of the generator is used and, for later pressure build-up for the gas bag, at least one additional generator or at least one second generator stage is provided.

* * * * *